INVENTORS
Karl Wilhelm &
Karl-Heinz Schmidt

BY Spencer & Kaye
ATTORNEYS

Jan. 26, 1965 K. WILHELM ETAL 3,167,615

F.M. STEREO DEMODULATOR USING A DIODE RING MODULATOR SWITCHING CIRCUIT

Filed Nov. 28, 1962 2 Sheets-Sheet 2

INVENTORS
Karl Wilhelm &
Karl-Heinz Schmidt

BY Spencer & Kaye

ATTORNEYS

United States Patent Office 3,167,615

Patented Jan. 26, 1965

3,167,615

F.M. STEREO DEMODULATOR USING A DIODE RING MODULATOR SWITCHING CIRCUIT

Karl Wilhelm and Karl-Heinz Schmidt, Hannover, Germany, assignors to Telefunken Patentverwertungs-G.m.b.H., Ulm (Danube), Germany Filed Nov. 28, 1962, Ser. No. 240,679
Claims priority, application Germany Dec. 2, 1961
12 Claims. (Cl. 179—15)

The present invention relates to stereophonic radio systems, and particularly to a compatible receiver circuit which is able to operate either stereophonically or monophonically.

Compatible stereophonic systems conventionally use a sum channel, also known as the middle channel or sound channel, and a difference channel, also known as the side channel or direction channel. The channels are obtained by suitable microphones, particularly those having a spherical or figure-eight characteristic, or, if conventional microphones are used, by obtaining low-frequency sum and difference voltages. In the case of stereophonic broadcasting, such low-frequency channels are likewise used.

One type of stereophonic radio system, described in "Nachrichtentechnische Zeitschrift" (NTZ) (a German publication), 1961, pages 379 and 380, operates by modulating the main carrier of the transmitter firstly, with the sum signal $LF_S$, secondly, with a sub-carrier frequency (38 kilocycles) on which the difference signal $LF_D$ is transmitted by amplitude modulation with suppressed carrier, hereinafter referred to as the "sub-carrier signal," and thirdly, with a pilot frequency (19 kilocycles) equal to half the sub-carrier frequency.

There exist two methods by which the two loud-speaker signals can be derived from the stereophonic signal and reproduced by the receiver. According to the first of these methods, the above-mentioned three modulation components are separated from each other by means of suitable filters. The pilot frequency is doubled and added to the sub-carrier signal in proper phase relation, and the thus-obtained mixture is demodulated, in conventional manner, by rectification, so as to recover the low-frequency difference signal $LF_D$. Finally, the right and left channels, i.e., the two loud-speaker signals, are derived from the low-frequency sum signal $LF_S$ and the low-frequency difference signal $LF_D$, in a so-called matrix, by means of sum and difference formation. This is shown in NTZ, 1961, page 380, FIGURE 1.

The second method is based on the fact that a frequency multiplex system wherein the sum signal is transmitted directly (i.e., by direct modulation of the main carrier) and wherein the sub-carrier is amplitude-modulated with the difference signal, produces, when the amplitudes of the right signal (and left signal) in the sum signal and in the sub-carrier signal are alike, the same result as does a time-division multiplex method wherein there is a periodic switch-over between the right and left signals, the switch-over occurring in synchronism with the sub-carrier frequency of the frequency multiplex system, when the harmonics of the switch-over frequency, and its modulation, are suppressed. See NTZ, 1961, No. 3, pages 129 to 141, particularly page 132, and "Audio," June 1961 (a United States publication), pages 21 to 23. In the second method, only the pilot frequency (19 kilocycles) is filtered out of the entire stereophonic signal obtained by demodulating the received high frequency. This pilot frequency is doubled (38 kilocycles), and, the remaining stereophonic signal, namely, the sum signal $LF_S$ and the sub-carrier signal, is demodulated such that both of these signals together are switched, in synchronism with the 38 kilocycle frequency and by means of a beam deflection tube to the two loud-speaker channels. See "Funkschau," 1961 (a German publication), pages 466 and 467, FIGURE 4, and "Electronics," issue of August 18, 1961 (a United States publication), pages 45 to 47, FIGURE 3. In the case of this so-called multiplicative demodulation, the sum and differences, required for the two loud-speaker channels, are derived simultaneously. However, the two outputs of the beam deflection tube will have added thereto the sum signal of opposite phase and of predetermined amplitude (from the cathode of the tube), so that there will be present the amplitude ratio necessary for the sum and difference formation. This demodulation has the advantage that the filters needed for the first method are eliminated, as are the means necessary to compensate for the time delay differences of the signals in the sum and difference channels. This type of demodulation has the further advantage that the noise carried by the pilot frequency (19 kilocycles) cannot reach the output. Furthermore, the noise of the even harmonics of the sub-carrier (38 kilocycles) cannot pass because despite the sinusoidal sub-carrier, the tube operates in what is for all practical purposes a square wave pattern, and an alternating voltage of square wave shape contains only odd harmonics. One drawback, however, is that the electronic switching requires the above-mentioned special tube with beam deflection, which increases the costs in comparison with the first method.

It is, therefore, an object of the present invention to provide a circuit arrangement which overcomes the disadvantages of the above-described second method while at the same time retaining its advantages. This is accomplished by a circuit incorporating, in essence, the following characteristic features:

(*a*) The electronic switch is constituted by a ring modulator incorporating diodes, one diagonal of the modulator having the sub-carrier applied to it, the two loud-speaker channels each being taken off, via a decoupling resistor, across a respective one of the two end points of the other diagonal of the modulation, and ground.

(*b*) The entire stereophonic signal is applied across the symmetry point of the first-mentioned diagonal and ground.

(*c*) The entire stereophonic signal or at least the low-frequency sum signal $LF_S$, is applied to each of the loud-speaker channels, via a respective ohmic resistance, in a phase opposite to that with which the entire signal is applied to the point of symmetry, the magnitude of the signal applied to the channels being so much smaller that the sum and difference of the sum and difference signals produced in the ring modulator are brought to the irrequisite amplitude ratio.

(*d*) Each diode has serially connected with it a purely ohmic resistance which is sufficiently large to render the diode characteristic substantially linear.

It is known to use a diode-equipped ring modulator for decoding the signal in a stereophonic broadcasting system operating with time-division multiplexing, namely, the PAM, or pulse-amplitude modulation, system. See "Elektronische Rundschau," 1959 (a German publication), page 448, FIGURE 6. However, in such systems the diodes operate with peak rectification and for this reason the diodes are conductive for only short periods during the half cycle of the switching frequency, the reason for this being that the resistors connected in series with the diodes are shunted by capacitors. As set forth above in (*d*), this capacitor-shunting is definitely excluded in a circuit according to the present invention, even though this measure reduces the output voltages. Thus, in a circuit according to the instant invention, the diodes are conductive for a large proportion of the time. In this way, the circuit as a whole operates with low noise, which is one of the advantages of the above-described second method.

It is also known, as described in "Audio," June 1961, pages 21 to 23, FIGURE 4, to use two bridging demodulators for decoding a stereophonic broadcast having an amplitude-modulated sub-carrier of 38 kilocycles which itself is suppressed, as well as a pilot frequency of 19 kilocycles. The entire stereophonic signal obtained by demodulation is applied to both demodulators, the latter being controlled by the sub-carrier frequency (38 kilocycles) obtained from the pilot frequency (19 kilocycles) by means of a locked oscillator. In contra-distinction thereto, the present invention requires but a single bridging demodulator, namely, a ring modulator.

Additional objects and advantages of the present invention will become apparent upon consideration of the following description when taken in conjunction with the accompanying drawings in which.

Figure 1:
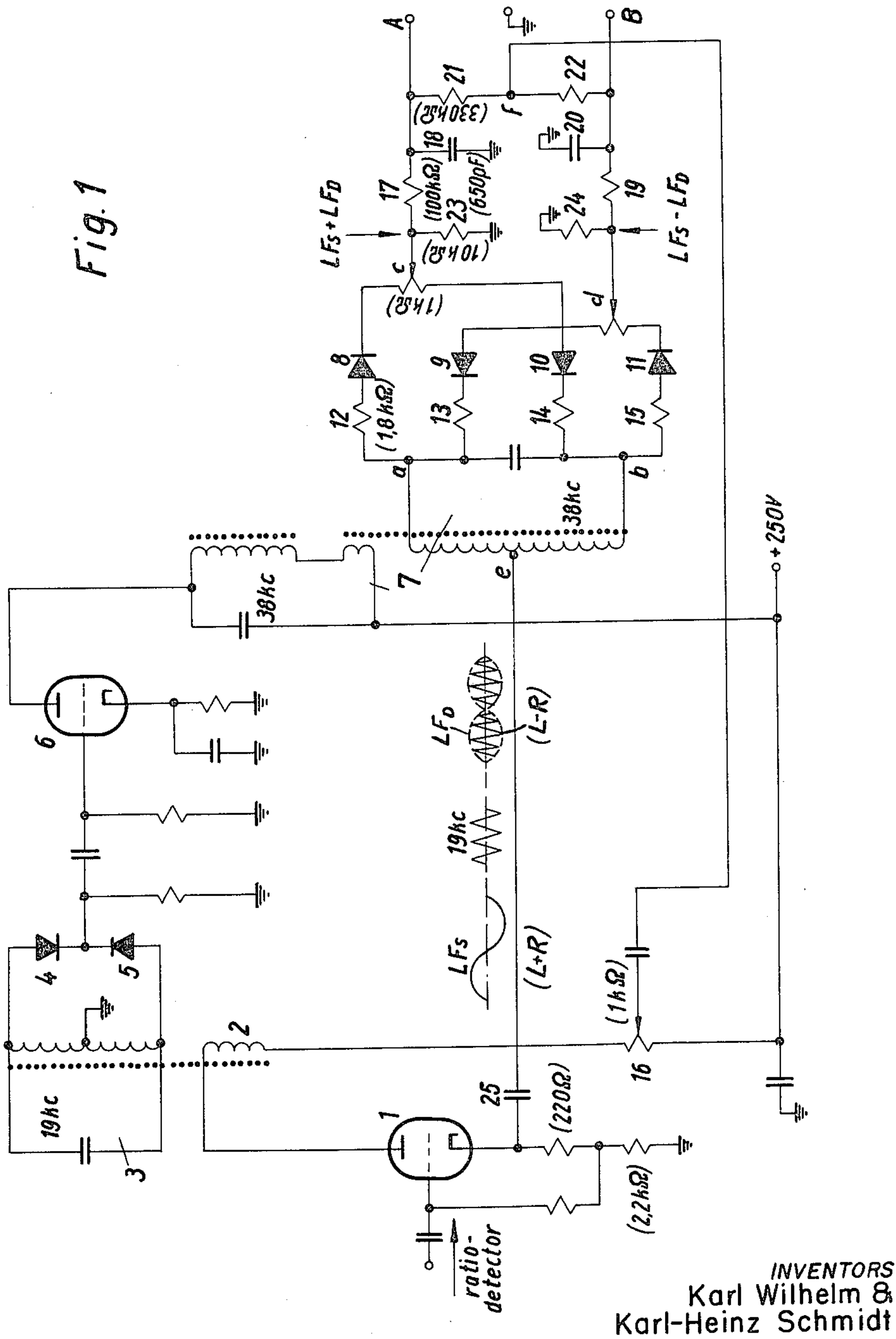
FIGURE 1 is a circuit diagram of one embodiment of the present invention.

Referring now to the drawings and to FIGURE 1 thereof in particular, the same shows the input at the left and the outputs for the two loud-speaker channels A and B at the right. At the input, the signal demodulated by the ratio detector of the receiver (not shown) and branched off ahead of the conventional deemphasis member is applied to the tube 1. This stereo signal coming from the ratio detector appears, with almost the same amplitude, at the cathode of tube 1 from whence it is applied, via a coupling capacitor 25, to the point *e* of a four-branch ring modulator, this being the symmetry point of the diagonal whose ends are indicated at *a* and *b*, hereinafter referred to as the "input" diagonal. FIGURE 1 shows the three components of the entire stereophonic signal which pass through the lead connected to point *e*, namely, the low-frequency sum signal $LF_S$, i.e., the signal composed of the sum of the right signal R and the left signal L; the pilot frequency of 19 kilocycles which is not needed at point *e* but which does no harm; and the sub-carrier signal which is constituted by the sub-carrier of 38 kilocycles amplitude-modulated by the low-frequency difference signal $LF_D$ with suppressed carrier. The envelope crossing the horizontal axis corresponds to the difference signal $LF_D$, i.e., the difference between the right signal R and the left signal L.

The pilot frequency of 19 kilocycles is filtered out of the entire stereophonic signal appearing at the anode of tube 1 by means of the resonant circuit 3 coupled to the anode circuit by the coil 2. The frequency of the filtered-out pilot frequency is then doubled by means of rectifiers 4 and 5. The advantage of doubling the frequency by means of diodes rather than by means of an amplifier tube having a curved charactertistic is that the ratio of the voltage of the sub-carrier obtained by the frequency doubling to the voltage of the pilot frequency, and hence also the ratio of the sub-carrier signal to the pilot frequency, is virtually independent of the amplitude of the input signal, so that the voltage of the sub-carrier can at the very outset be set to its optimum value. This type of frequency doubling also allows the demodulator to be designed optimally. Furthermore, the locked oscillator used for frequency doubling is eliminated.

The sub-carrier obtained as a result of the frequency doubling is amplified by a tube 6, which, in practice, can be combined with the tube 1. The amplified sub-carrier is applied, on the anode side, to the input terminals constituted by end points *a*, *b*, of the input diagonal of the ring modulator via the two resonant circuits 7 which shift the phase of the sub-carrier frequency by 90°, to correspond with the pre-selected phase relation at the transmitter end.

The ring modulator is constituted by rectifier diodes 8, 9, 10, 11, connected together in a ring, the diodes being conductive in the same direction around the ring. The ohmic resistors 12, 13, 14, 15, which are serially connected with the respective diodes (and which could just as well be located on the right-hand side of the diodes, as viewed in FIGURE 1, rather than on their respective left-hand sides) and the potentiometers located at end points *c* and *d* of the other diagonal linearize the characteristics of the diodes; the potentiometers themselves, having linear characteristics, serve also to balance the modulator. The ohmic resistances 12, 13, 14, 15, and the potentiometers also serve to protect the diodes against overload, because the amplitude of the intermediate carrier of 38 kilocycles is relatively large, for example, 6 v., while the entire stereophonic signal applied to point *e* has a voltage of only about 2 v. The high voltage of the sub-carrier, in conjunction with the fact that there are no capacitative shunts across the ohmic resistors 12, 13, 14, 15, will cause the diodes 8 and 10 to be conductive throughout almost the entire duration of half a cycle of the sub-carrier while the diodes 9 and 11 will be conductive through almost the entire duration of the other half of the cycle. Thus, the stereophonic signal between point *e* and ground will be alternatively switched, in synchronism with the sub-carrier, to the points *c* and *d* constituting the output terminals of the output diagonal of the ring modulator. In this way, half of the sum signal $LF_S$ will be switched to point *c* and the other half to point *d*, whereat it will appear at half the amplitude but at the same phase. The sub-carrier signal, however, reaches the output in a different way. During one half cycle of the envelope, the half cycles of the high frequency are switched alternately to the outputs *c* and *d* under the influence of the sub-carrier of the same phase. Therefore, the positive half cycles of the high frequency appear in positive direction at one output and the negative half cycles appear in negative direction at the other output. The average value of the high-frequency half cycles is equal to approximately one third of the amplitude of the high-frequency oscillations at point *e* and represents the first half cycle of the low frequency $LF_D$. During the other half cycle of the envelope, the high-frequency half cycles are applied to both outputs with opposite polarity, because at the cross-over point of the envelope the high-frequency oscillations undergo, as is well known, a phase shift of 180°. As a result, the other half cycle of the low frequency $LF_D$ will appear at the outputs *c* and *d* with the correct phase.

Because the amplitude ratio of the two signals $LF_S$ and $LF_D$ is ½ to ⅓, i.e., because the amplitude $LF_S$ is too large, it is necessary that, in order to obtain the correct sum and difference formation for obtaining the loudspeaker channels A and B, a certain amplitude of the low-frequency sum signal $LF_S$ be applied to point *f* with opposite phase. This amplitude is obtained from potentiometer 16 connected in the anode circuit of tube 1, the voltage taken from this potentiometer 16 being opposite in phase to the phase at the cathode. The opposite phase voltage $LF_S$ is purposely applied to point *f* and not to the base points of resistors 23 and 24 because this would interfere with the proper operation of the ring modulator. Therefore, decoupling resistors 17 and 19 are provided. These resistors, namely, 23, 17 and 24, 19, if given the values shown in FIGURE 1, allow only a very small part of the voltage applied to points A and B from *f* to reach the points *c* and *d*. The resistors 17, 21 and 19, 22, in conjunction with the capacitors 18 and 20, respectively, also serve as deemphasis members as well as for suppressing the remaining high frequency.

The above circuit is adapted for stereophonic reception. It will be appreciated, however, that even though a radio set is able to receive stereophonic broadcasts, it should still be able to receive monophonic broadcasts as well. Inasmuch as the stereo system is compatible with monophonic operation, single-channel broadcasts can be received by a stereo receiver without switch-over. However, in single channel operation, particularly if the signal is weak, the signal-to-noise ratio is substantially improved if the stereo adapter is turned off. It is known that change-over from monophonic to stereophonic operation can be effected automatically by rectifying the subcarrier which must in any event be present in a newly received stereophonic signal, or a pilot frequency of half the frequency of the sub-carrier, and by letting the thus-obtained direct voltage bring about the change-over. Such a circuit uses a relay whose contacts switch the stereo components constituting the adapter on or off. If there is no pilot signal, due to the fact that the broadcast is a monophonic one, the components necessary for stereo operation are by-passed and the two loud-speaker channels are connected in parallel. In practice, such an arrangement requires, in addition to the relay, three further transistors. See, for example, "Funkschau," 1962, pages 377 and 378.

Figure 2:
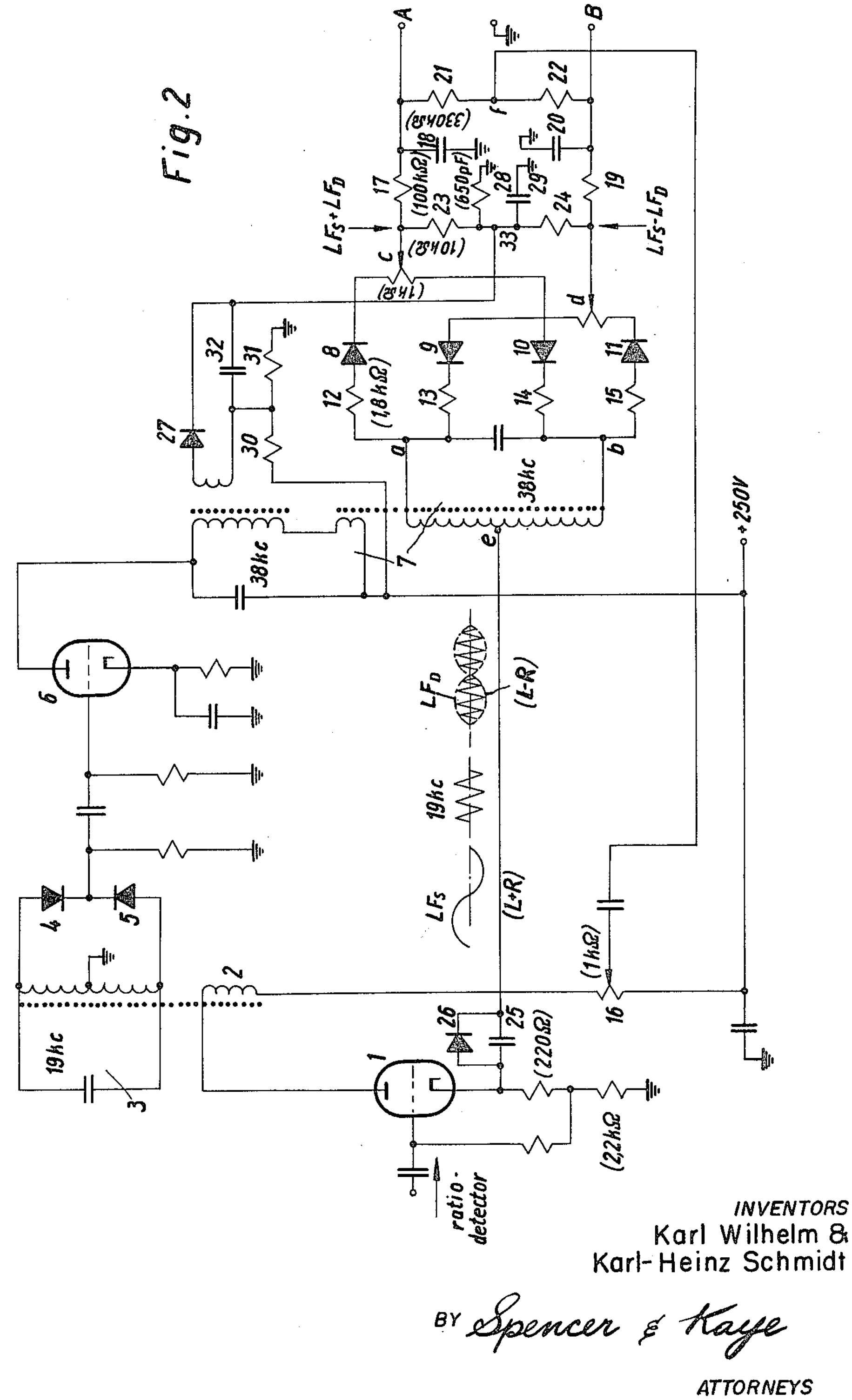
FIGURE 2 is a circuit diagram of another embodiment of the present invention wherein the switch-over between monophonic and stereophonic operation is effected automatically.

FIGURE 2 shows an arrangement according to the present invention in which the automatic switch-over between monophonic and stereophonic operation is substantially simplified.

In essence, this is accomplished as follows: during monophonic operation, the low-frequency alternating current coming from the demodulator and a superimposed direct current which is greater than the peak value of the low-frequency alternating current, are simultaneously passed through the ring modulator, and during stereophonic operation, there is passed through the ring modulator a direct current which is derived from rectification of the sub-carrier and which flows in the opposite direction in order to neutralize the above-mentioned superimposed direct current.

In order to make this neutralization independent of the level of the incoming signal and also independent of fluctuations in the power supply, the line carrying the low-frequency current and the superimposed direct current includes a parallel circuit constituted by a coupling capacitor and rectifier which passes the superimposed direct current. This rectifier prevents the flow of the neutralizing direct current as soon as it reaches the value of the superimposed direct current.

FIGURE 2 shows the same circuit components as depicted in FIGURE 1, the same being identified by the same reference characters. Additionally, the circuit includes components 26 through 32, as well as a connecting point 33 at which the resistances 23 and 24 are joined, these resistors not being grounded as was the case in the circuit of FIGURE 1.

Without components 26 through 32 and the connection 33 the stereo adapter, i.e., the stereo decoding circuit, could process monophonic signals and simultaneously apply the signal to both loud-speaker channels A and B. However, the reception would be distorted and there would be a considerable amount of noise. The distortion would be due to the fact that the diodes 8, 9, 10, 11, of the ring modulator would pass only a half cycle of the low-frequency alternating current, so that, due to the curved characteristic of the diodes, there would be a distortion of the oscillations as they pass through zero. In order to avoid this, a direct current, acting as a bias current, is passed through the modulator so that the operating point of the diodes will no longer lie on the sharply curved portion of their characteristics but on an approximately rectilinear portion thereof. In the illustrated embodiment, the bias current is taken from the output circuit of the tube 1, more particularly from the cathode, as shown in the drawing. For this purpose, it would be possible to replace the capacitor 25 with a short-circuit connection, but, as explained above and as will be elaborated on more fully below, the capacitor 25 is retained and is shunted by a diode 26 through which flows the direct current to be superimposed.

This current, however, cannot be allowed to flow in the case of stereo operation. Therefore, the current is neutralized as follows: a direct current is derived from the sub-carrier frequency of 38 kilocycles by means of a rectifier 27 and a loading resistor 28 and capacitor 29, which current is applied to the point 33. From there, the direct current flows via resistors 23 and 24 through the ring modulator to the cathode of tube 1 and from there to the negative terminal, i.e., ground. This backwardly flowing current neutralizes the above-mentioned superimposed direct current when the former is exactly equal to the latter. This can be accomplished by limiting the direct current coming from rectifier 27 to the required value. However, since the superimposed direct current can still vary as a result of fluctuations in the supply voltage to which the set is connected, it is better to insure the correct compensation by means of the rectifier 26. In this way, the neutralizing direct current cannot become greater than the superimposed direct current because the rectifier 26 would not allow such larger current to pass.

The operating point of diode 27 and therefore the point at which the circuit responds can be pre-set by selecting appropriate values for the resistors 30 and 31 which together form a voltage divider. A capacitor 32 is provided for grounding the high-frequency voltage.

The superimposed direct current flowing during monophonic operation has the further effect that the noise will not be greater than when the adapter is turned off. Without this superimposed current, there would be additional noise due to the fact that, during monophonic operation, the unused channel (tube 6) would introduce noise into the ring modulator. However, inasmuch as the diodes of the ring modulator are biased by the superimposed direct current, the noise voltages, which are substantially smaller than the superimposed direct current, no longer have any effect on the diodes and therefore have virtually no effect on the output channels A and B.

It will be understood that the above description of the present invention is susceptible to various modifications, changes, and adaptations, and the same are intended to be comprehended within the meaning and range of equivalents of the appended claims.

What is claimed is:

1. A circuit arrangement for obtaining two loud-speaker signals and usable in a multiplex-type stereo receiver which is compatible with monophonic operation, wherein the main carrier is modulated firstly, with the low-frequency sum signal, secondly, with a sub-carrier frequency on which the difference signal is transmitted by amplitude modulation with suppressed carrier, and thirdly, with a pilot frequency equal to half the sub-carrier frequency by means of which the sub-carrier is obtained in the receiver by doubling the frequency of the pilot frequency, and wherein the thus-obtained sub-carrier is used to switch electronically the entire stereophonic signal derived by demodulation of the received high frequency alternately from one loud-speaker channel to the other, with the sub-carrier remaining switched to each respective loud-speaker channel for the duration of one half cycle of the sub-carrier, said circuit arrangement comprising:

(*a*) a ring modulator incorporating a plurality of diodes, one of the diagonals of said ring modulator having said sub-carrier applied across it and the other diagonal being connected, via decoupling resistors, to said loud-speaker channels, respectively, the latter being grounded on one side;

(*b*) means for applying the entire stereophonic signal across the point of symmetry of said one diagonal and ground;

(*c*) means for applying to said loud-speaker channels, via respective ohmic resistances, at least the low-frequency sum signal of the entire stereophonic signal with a phase that is inverted with respect to said symmetry point and which is smaller than the signal applied to said symmetry point by an amount sufficient that the sum and difference formations of the sum and difference signals produced in said ring modulator is brought to the requisite amplitude ratio of the sum and difference signals; and (*d*) a plurality of purely ohmic resistors each connected in series with a respective one of said diodes of said ring modulator, each such resistor being sufficiently large substantially to linearize the characteristics of the respective diodes.

2. In combination with a compatible multiplex-type stereo receiver wherein the main carrier is modulated firstly, with the low-frequency sum signal, secondly, with a sub-carrier frequency on which the difference signal is transmitted by amplitude modulation with suppressed carrier, and thirdly, with a pilot frequently equal to half the sub-carrier frequency by means of which the intermediate carrier is obtained on the receiver side by doubling the frequency of the pilot frequency, and wherein the thus-obtained sub-carrier is used to switch electronically the entire stereophonic signal derived by demodulation of the received high frequency alternately from one loud-speaker channel to the other, with the sub-carrier remaining switched to each respective loud-speaker channel for the duration of one half cycle of the sub-carrier, a circuit arrangement comprising:

(1) a ring modulator incorporating four branches, each branch having a diode and all diodes being conductive in the same direction around the ring, each branch further having a purely ohmic resistance in series with its respective diode for linearizing the characteristic thereof, said ring modulator having two input terminals located at the ends of one diagonal of the ring modulator and two output terminals located at the ends of the other ring diagonal;

(2) means for applying the sub-carrier across said input terminals;

(3) a first decoupling resistor having one end connected to one of said output terminals;

(4) a first loud-speaker channel connected across the other end of said first decoupling resistor and ground;

(5) a second decoupling resistor having one end connected to the other of said output terminals;

(6) a second loud-speaker channel connected across the other end of said second decoupling resistor and ground;

(7) means for applying the entire stereophonic signal across the point of symmetry of said one diagonal and ground;

(8) a third resistor having one end connected to said first loud-speaker channel;

(9) a fourth resistor having one end connected to said second loud-speaker channel; and

(10) means for applying to the other end of each of said third and fourth resistors at least the low-frequency sum signal of the entire stereophonic signal with a phase that is inverted with respect to said point of symmetry, the signal applied to the respective channels being smaller than the signal applied to said point of symmetry by an amount sufficient that the sum and difference formation of the sum and difference signals produced in said ring modulator is brought to the requisite amplitude ratio of the sum and difference signals.

3. A circuit arrangement as defined in claim 2 wherein said ring modulator further incorporates two potentiometers located at the ends of said other diagonal for allowing said modulator to be made symmetrical with respect to ground, taps on said potentiometers constituting said output terminals.

4. A circuit arrangement as defined in claim 2, further comprising an amplifier tube having two resistances incorporated in its anode and cathode circuits, the voltage applied by said means (7) to said point of symmetry being derived from one of said two last-mentioned resistances and the voltage of inverted phase applied by said means (10) to said loud-speaker channels via said third and fourth resistors being derived from the other of these two resistances.

5. A circuit arrangement as defined in claim 4, further comprising a resonant circuit coupled to the circuit of said amplifier tube for selecting the pilot frequency.

6. A circuit arrangement as defined in claim 5, further comprising a frequency doubler connected to said resonant circuit for producing the sub-carrier frequency.

7. A circuit arrangement as defined in claim 6 wherein said frequency doubler comprises diode rectifiers.

8. A circuit arrangement as defined in claim 6 wherein said frequency doubler comprises a full-wave rectifier incorporating diodes.

9. A circuit arrangement as defined in claim 4 wherein at least one of the two resistances incorporated in the tube circuit is variable, thereby allowing said amplitude ratio to be adjusted.

10. A circuit arrangement as defined in claim 2, further comprising means for automatically switching the circuit between monophonic and stereophonic operation, depending on the incoming signal, said automatic switching means including means for applying to said ring modulator, during monophonic operation, the low-frequency alternating current derived from the demodulator as well as a superimposed direct current which is greater than the peak value of said low-frequency alternating current; and means applying to said ring modulator, during stereophonic operation, a direct current derived by rectification of the sub-carrier, said last-mentioned direct current being opposed to said superimposed direct current for neutralizing the same.

11. A circuit arrangement as defined in claim 10, further comprising an amplifier tube having an output circuit, said superimposed direct current as well as said low-frequency alternating current being derived from said output circuit.

12. A circuit arrangement as defined in claim 11 wherein said means for applying low-frequency alternating current and the superimposed direct current to said modulator during monophonic operation comprise a line incorporating a parallel circuit one branch of which is a coupling capacitor and the other branch of which is a rectifier which passes the superimposed direct current.

References Cited in the file of this patent

UNITED STATES PATENTS 3,070,662 Eilers ---------------- Dec. 25, 1962

OTHER REFERENCES

Audio, "Fm-Stereo: Time Division Approach," August 1961 (pp. 20–22 and 96 relied on).

Crowhurst: "Clear Road For FM Stereo," Radio-Electronics, July 1961 (pp. 26–28 relied on).